(12) United States Patent
Hauser et al.

(10) Patent No.: US 12,060,479 B2
(45) Date of Patent: Aug. 13, 2024

(54) FLUORO-THERMOPLASTIC ELASTOMER BLENDS

(71) Applicant: Arkema Inc., King of Prussia, PA (US)

(72) Inventors: Adam W. Hauser, Philadelphia, PA (US); Mathieu Y. Capelot, Bernay (FR); Florence Mehlmann, Berwyn, PA (US); Gregory S. O'Brien, Downingtown, PA (US)

(73) Assignee: ARKEMA INC., King of Prussia, PA (US)

( * ) Notice: Subject to any disclaimer, the term of this patent is extended or adjusted under 35 U.S.C. 154(b) by 555 days.

(21) Appl. No.: 17/299,802

(22) PCT Filed: Dec. 5, 2019

(86) PCT No.: PCT/US2019/064647
§ 371 (c)(1),
(2) Date: Jun. 4, 2021

(87) PCT Pub. No.: WO2020/118033
PCT Pub. Date: Jun. 11, 2020

(65) Prior Publication Data
US 2022/0025166 A1 Jan. 27, 2022

Related U.S. Application Data (60) Provisional application No. 62/776,092, filed on Dec. 6, 2018.

(51) Int. Cl.
*C08L 27/16* (2006.01)
*B29C 45/00* (2006.01)
*B29K 27/12* (2006.01)

(52) U.S. Cl.
CPC .......... *C08L 27/16* (2013.01); *B29C 45/0001* (2013.01); *B29K 2027/12* (2013.01); *C08L 2205/025* (2013.01); *C08L 2207/04* (2013.01)

(58) Field of Classification Search
None
See application file for complete search history.

(56) References Cited

U.S. PATENT DOCUMENTS 4,713,418 A * 12/1987 Logothetis .............. C08L 27/18
525/200
6,310,141 B1 * 10/2001 Chen ....................... C08L 27/12
525/200

(Continued)

FOREIGN PATENT DOCUMENTS

EP 0168020 B1 10/1989
JP 2001011272 A 1/2001

(Continued)

OTHER PUBLICATIONS

Dyneon website (Year: 2023).*

*Primary Examiner* — Mark S Kaucher
(74) *Attorney, Agent, or Firm* — Joanne Rossi (57) ABSTRACT

Disclosed is a thermoplastic elastomer composition comprising a blend of at least two fluoropolymers. The first fluoropolymer has from 0 to 30 weight percent of a monomer J selected from the group consisting of hexafluoropropene (HFP), fluorinated or perfluorinated vinyl ethers, 2,3,3,3-tetrafluoropropene, trifluoropropene, 1-chloro-3,3,3-trifluoro propene or combinations thereof. The second fluoropolymer has at least 30 weight percent, preferably at least 35 weight percent, of monomer T selected from the group consisting of hexafluoropropene (HFP), fluorinated or perfluorinated vinyl ethers, 2,3,3,3-tetrafluoropropene, trifluoropropene, 1-chloro-3,3,3-trifluoro propene or combinations thereof.

20 Claims, 9 Drawing Sheets (56) References Cited

U.S. PATENT DOCUMENTS

| | | |
|---|---|---|
| 6,586,547 B1 | 7/2003 | Amin-Sanayei et al. |
| 6,624,251 B1 | 9/2003 | Chmielewski |
| 7,718,727 B2 | 5/2010 | Hartmann et al. |
| 2011/0009572 A1 | 1/2011 | Schaefer et al. |
| 2011/0250439 A1* | 10/2011 | Qi ........................ G03G 15/162 399/302 |
| 2015/0041118 A1* | 2/2015 | Chalumeau ............ E21B 17/20 427/434.2 |
| 2016/0037878 A1 | 2/2016 | Yabe et al. |
| 2016/0200907 A1 | 7/2016 | Amin-Sanayei et al. |
| 2019/0203026 A1 | 7/2019 | Sanguineti et al. |
| 2021/0018713 A1* | 1/2021 | Hebrink ................ C09D 127/16 |

FOREIGN PATENT DOCUMENTS

| | | | | |
|---|---|---|---|---|
| WO | 198706597 A1 | 11/1987 | | |
| WO | WO-2016130413 A1 * | 8/2016 | ................ | C08F 2/01 |

* cited by examiner

FLUORO-THERMOPLASTIC ELASTOMER BLENDS

This application is a national stage application under 35 U.S.C. § 371 of PCT Application PCT/US2019/064647, filed Dec. 5, 2019; which claims benefit to U.S. Provisional Application No. 62/776,092, filed Dec. 6, 2018; said applications incorporated herein by reference.

FIELD OF THE INVENTION

The present invention relates to a thermoplastic elastomer composition based on fluoropolymers, and preferably on copolymers comprising vinylidene fluoride (VDF)-derived units and hexafluoropropene (HFP)-derived units. This composition makes it possible to manufacture wearable or consumer electronics articles or article parts using a thermoplastic shaping process.

BACKGROUND

Achieving two-phase materials via polymer blending is well known to those in the polymer science field. Additionally, it is widely known that a chemically crosslinked discrete soft phase within a thermoplastic phase (thermoplastic vulcanizate or TPV) can give the desired properties of a thermoplastic elastomer, whose elastic properties are derived from the crosslinked phase. Such materials are useful in fields typical of classical fully crosslinked rubbers, but are advantageous in that they can be processed as a thermoplastic and are recyclable. By recyclable, it is meant that the polymer formed into an article or the scrap from the process may be re-formed into another article without significant degradation or property changes (less than 20% change, preferably less than 10% change). TPVs are generally made through an often complicated dynamic vulcanization process by which one phase is crosslinked during extrusion. There is a need to simplify these materials for ease of manufacture without sacrificing properties.

Document U.S. Pat. No. 6,624,251 discloses the use of a fluorinated thermoplastic mixed with a crosslinkable fluororesin to ultimately achieve a discrete crosslinked phase within a thermoplastic, which is referred to as a thermoplastic vulcanizate (TPV). Document WO2018046355 discloses the use of certain fluoropolymers mixed with a plasticized crosslinkable fluororesin to be crosslinked as the discrete soft phase to achieve materials described as TPVs to achieve elastomeric properties. Document US2016200907 shows that latexes can be blended to achieve small (less than 1 micron in diameter) discrete fluoropolymer particles within a fluoro-thermoplastic matrix for impact modified thermoplastics; these blends do not show other morphologies nor do they show elastomeric properties.

In the consumer electronics and wearables industry, a number of devices are intended to be in contact with the human body. There are a number of desired requirements for such devices, such as high softness and elasticity, a soft touch, stain and chemical resistance, as well as ease of processing into various shapes. Two main kinds of polymers are conventionally used in these applications. First, crosslinked fluoroelastomers, which generally have excellent mechanical properties and chemical resistance, some (but limited) stain resistance but are difficult to process due to the requirement to first formulate the product with ingredients to provide crosslinking, then the requirement to crosslink the elastomer in a hot mold and to eject or remove articles. Second, thermoplastic elastomers, such as polyurethanes, which are generally easy to process and have good mechanical properties but often have poor stain and chemical resistance. Besides, the desired "soft touch" property usually requires the addition of a silicone coating on top of these polymers.

By way of example, document US 2016/0037878 discloses a wristband made of a crosslinked fluoroelastomer. High cost and poor yield are the two main drawbacks of such a material.

Document U.S. Pat. No. 7,718,727 discloses blends of fluororesins and crosslinked silicone. Such blends have good mechanical properties and improved touch feeling but are difficult to transform into final articles due to the reactive nature of the silicone phase. In this document, reactive extrusion is used: a process that is difficult and costly to properly control.

Document US 2011/0009572 relates to non-crosslinked silicone copolymers blended in thermoplastic matrices. The processability of such compositions is good, but they are believed to have limited stain and chemical resistance.

There is thus a need for providing a polymer composition suitable for the wearables and consumer electronics industry, which has high softness and elasticity, stain and chemical resistance, and is easy to process into various shapes.

SUMMARY OF THE INVENTION

Disclosed is a composition that comprises a blend of uncrosslinked sufficiently high viscosity (or molecular weight) soft fluoropolymers "S" with uncrosslinked sufficiently high viscosity (or molecular weight) hard fluoropolymers "H". A wide range of easily processable materials is achievable that mechanically range from tough thermoplastics to soft elastomers (TPE). The morphology of the final composition can be discrete soft particles within a harder matrix, co-continuous soft and hard phases, or discrete hard particles within a soft matrix. This is achieved through adjustments of volume % or weight %, melt viscosity ratio, melt viscosity and controlling crystallinity of the hard and soft fluoropolymers.

Importantly, through this method, we can achieve true elastomeric behavior in each morphology type listed above.

Controlling the morphology and mechanical properties is crucial to achieving easily processable and highly stain resistant materials that exhibit elastic behavior. More specifically related to processing, these blends can be easily injection molded to make a part with less than 5% shrinkage under normal injection conditions. Shrinkage defined here as a length change from a mold length of 165 mm of ASTM standard Type I tensile bars as measured with calipers with a sensitivity of at least 0.1 mm.

Achieving both co-continuous and discrete hard particle morphologies are unique to this approach. A TPV is by definition limited to discrete soft crosslinked particles within a hard matrix.

The invention relates to a composition comprising a blend of fluoropolymers comprising at least one soft phase fluoropolymer "S" and at least one hard phase fluoropolymer "H" wherein the composition comprises from 20 to 80 weight % of S and from 80 to 20 weight % H. Both Polymer S and polymer H are made without crosslinkers.

In one embodiment, the polymer H fluoropolymer is a homopolymer or copolymer having at least 70 weight percent of vinylidene fluoride monomer units. S is a fluoropolymer copolymer having at least 35 weight %, preferably at least 40 weight % HFP.

The composition is prepared by combining polymer S with polymer H in a ratio from 20 to 80 weight percent of S with from 80 to 20 weight percent of polymer H; preferably from 25 to 75 weight percent of S with from 75 to 25 weight percent of polymer H; more preferably from 60 to 40 weight percent of S with from 40 to 60 weight percent of polymer H; based on total weight of H and S combined. In one embodiment the blend is prepared by combining or mixing a latex of S with a latex of H in the desired proportion. The fluoropolymers S and H can also be in the form of a powder when combined together.

Aspects of the Inventions

Aspect 1. A fluoropolymer composition comprising a fluoropolymer blend comprising fluoropolymer S and fluoropolymer H wherein:

H is a fluoropolymer which comprises from 0 to 30 weight percent, preferably 15 to 30 weight percent, more preferably 20 to 30 weight percent of a monomer J selected from the group consisting of HFP, fluorinated or perfluorinated vinyl ethers, 2,3,3,3-tetrafluoropropene, trifluoropropene, 1-chloro-3,3,3-trifluoro propene or combinations thereof;

S preferably comprise at least 35 weight percent, preferable at least 40 weight percent, most preferably at least 43 weight percent of monomer T selected from the group consisting of hexafluoropropene (HFP), fluorinated or perfluorinated vinyl ethers, 2,3,3,3-tetrafluoropropene, trifluoropropene, 1-chloro-3,3,3-trifluoro propene or combinations thereof, and wherein, the amount of H is from 20 to 80 weight % of the composition, and the amount of S is from 80 to 20 weight % of the composition.

Aspect 2. A fluoropolymer composition comprising a fluoropolymer blend comprising fluoropolymer S and fluoropolymer H wherein:

H is a fluoropolymer which comprises from 0 to 30 weight percent, preferably 15 to 30 weight percent, more preferably 20 to 30 weight percent of a monomer J selected from the group consisting of hexafluoropropene (HFP), fluorinated or perfluorinated vinyl ethers, 2,3,3,3-tetrafluoropropene, trifluoropropene, 1-chloro-3,3,3-trifluoro propene or combinations thereof;

S preferably comprise at least 30 weight percent, preferable at least 35 weight percent, most preferably at least 43 weight percent of monomer T selected from the group consisting of hexafluoropropene (HFP), fluorinated or perfluorinated vinyl ethers, 2,3,3,3-tetrafluoropropene, trifluoropropene, 1-chloro-3,3,3-trifluoro propene or combinations thereof, and wherein, the amount of H is from 20 to 80 weight % of the composition, and the amount of S is from 80 to 20 weight % of the composition, with the proviso that the weight percent of said monomer T in S is always at least 5% greater than the weight percent of said monomer J in H.

Aspect 3. The composition in aspect 1 or 2 is an elastomer having an elastic recovery of at least 80%, preferably at least 90%, when subjected to a stress/relaxation protocol according to ASTM standard D412.

Aspect 4. The fluoropolymer composition of any one of aspects 1 to 3, wherein the melt viscosity of H is from 1-30 kP as measured at 230° C. at 100 s$^{-1}$.

Aspect 5. The fluoropolymer composition of any one of aspects 1 to 4, wherein the melt viscosity of S is from 10-55 kP as measured at 230° C. at 100 s$^{-1}$.

Aspect 6. The fluoropolymer composition of any one of aspects 1 to 5, wherein H comprises at least one monomer selected from the group consisting of vinylidene fluoride (VDF), tetrafluoroethylene (TFE), trifluoroethylene (TrFE), chlorotrifluoroethylene (CTFE), hexafluoropropene (HFP), vinyl fluoride (VF), hexafluoroisobutylene (HFIB), perfluorobutylethylene (PFBE), pentafluoropropene, 3,3,3-trifluoro-1-propene, 2-trifluoromethyl-3,3,3-trifluoropropene, 1,1-dichloro-1,1-difluoroethylene, 1,2-dichloro-1,2-difluoroethylene, 1,1,1,-trifluoropropene, 1,3,3,3-tetrafluoropropene, 2,3,3,3-tetrafluoropropene, 1-chloro-3,3,3-trifluoropropene, fluorinated or perfluorinated vinyl ethers including perfluoromethyl ether (PMVE), perfluoroethylvinyl ether (PEVE), perfluoropropylvinyl ether (PPVE), perfluorobutylvinyl ether (PBVE), longer chain perfluorinated vinyl ethers, fluorinated dioxoles, partially- or per-fluorinated alpha olefins of C4 and higher, partially- or per-fluorinated cyclic alkenes of C3 and higher, fluorinated or partially fluorinated acrylates and methacrylates, and combinations thereof and combinations thereof.

Aspect 7. The fluoropolymer composition of any one of aspects 1 to 6, wherein S comprises at least one monomer selected from the group consisting of vinylidene fluoride (VDF), tetrafluoroethylene (TFE), trifluoroethylene (TrFE), chlorotrifluoroethylene (CTFE), hexafluoropropene (HFP), vinyl fluoride (VF), hexafluoroisobutylene (HFIB), perfluorobutylethylene (PFBE), pentafluoropropene, 3,3,3-trifluoro-1-propene, 2-trifluoromethyl-3,3,3-trifluoropropene, 1,1-dichloro-1,1-difluoroethylene, 1,2-dichloro-1,2-difluoroethylene, 1,1,1,-trifluoropropene, 1,3,3,3-tetrafluoropropene, 2,3,3,3-tetrafluoropropene, 1-chloro-3,3,3-trifluoropropene, fluorinated or perfluorinated vinyl ethers including perfluoromethyl ether (PMVE), perfluoroethylvinyl ether (PEVE), perfluoropropylvinyl ether (PPVE), perfluorobutylvinyl ether (PBVE), longer chain perfluorinated vinyl ethers, fluorinated dioxoles, partially- or per-fluorinated alpha olefins of C4 and higher, partially- or per-fluorinated cyclic alkenes of C3 and higher, fluorinated or partially fluorinated acrylates and methacrylates, and combinations thereof and combinations thereof.

Aspect 8. The composition of any one of aspects 1 to 7, wherein fluoropolymer H is a copolymer of VDF and HFP wherein the VDF comprises at least 70 weight percent of H.

Aspect 9. The composition of any one of aspects 1 to 8, wherein fluoropolymer S is a copolymer of VDF and HFP wherein the HFP comprises at least 30 weight percent of S, preferably at least 40 weight present of S and more preferable at least 45 weight percent of S.

Aspect 10. The composition of any one of aspects 1 to 9, wherein the amount of H is from 20 to 80 weight % of the composition, and the amount of S is from 80 to 20 weight % of the composition; preferably the wherein the amount of H is from 40 to 60 weight % of the composition, and the amount of S is from 60 to 40 weight % of the composition.

Aspect 11. The composition of any one of aspects 1 to 10, wherein the total proportion of fluoropolymer(s) H plus S in the composition is at least 85 weight. %, preferably at least 90 weight. %, more preferably at least 95 weight.

Aspect 12. The composition of any one of aspects 1 to 11, wherein the melt viscosity of the fluoropolymer blend, S plus H, is from 1000 to 4400 Pa·s, preferably from 1000 to 3000 Pa·s, more preferably from 800 to 2200 Pa·s, at a temperature of 230° C. and at a shear rate of 100 s$^{-1}$.

Aspect 13. The composition of any one of aspects 1 to 12, wherein the polymer blend is recyclable.

Aspect 14. The composition of any one of aspects 1 to 13, wherein the morphology is droplets of S in a matrix of H.

Aspect 15. The composition of any one of aspects 1 to 13, wherein the morphology is co-continuous, where both S and H are percolated through the network.

Aspect 16. The composition of any one of aspects 1 to 13, wherein the morphology is droplets of H in a matrix of S.

Aspect 17. The composition of any one of aspects 1 to 16, wherein the copolymers are synthesized by emulsion polymerization, blended as latex, then isolated as a blend by typical latex isolation processes.

Aspect 18. The composition of any one of aspects 1 to 16 wherein the copolymers are synthesized by suspension polymerization, blended as suspensions, then isolated as a blend by typical isolation processes.

Aspect 19. An article made from the composition of any one of aspects 1 to 18. Aspect 20. The article of aspect 19 wherein the article is manufactured by injection molding and exhibits less than 5% shrinkage upon de-molding.

Aspect 21. The article of any one of aspects 19 to 20 wherein the total proportion of fluoropolymer(s), S plus H, in the article is at least 85 weight %, preferably at least 90 weight %, more preferably at least 95 weight %.

Aspect 22. The article of any one of aspects 19 to 21, wherein the article is selected from wearable articles and consumer electronics articles, and is preferably selected from supports for sensors, supports for electronic devices, casings, belts, gloves, pads, strips and bands.

Aspect 23. The article of any one of aspects 19 to 22, wherein the article has high stain resistance towards stains such as ketchup and mustard.

Aspect 24. A process of making the article of any one of aspects 19 to 23 comprising a step of shaping said composition.

Aspect 25. The process of making the article of any one of aspects 19 to 23, comprising the steps of:
a) providing the composition in a solid form, preferably in the form of a powder, of granules, of pellets or of crumbs;
b) softening the composition by raising the temperature;
c) shaping the softened composition;
d) cooling down Aspect 26. The process of any one of aspects 24 to 25, wherein said shaping is performed by compression molding, injection molding, hot pressing or extrusion.

Aspect 27. The process of any one of aspects 24 to 25, wherein said shaping is performed by injection molding

DETAILED DESCRIPTION OF THE INVENTION

All references listed in this application are incorporated herein by reference. All percentages in a composition are weight percent, unless otherwise indicated, and all molecular weights are given as weight average molecular weight as determined by a GPC (Gel Permeation Chromatography using PMMA (poly(methylmethacrylate) as the standard, unless stated otherwise.

The term "polymer" is used to mean both homopolymers, copolymers and terpolymers (three or more monomer units), unless otherwise stated. Any copolymer or terpolymer can be random, blocky, or gradient, and the polymer can be linear, branched, star-shaped, comb-shaped or of any other architecture.

The invention provides for a fluoropolymer composition comprising a fluoropolymer blend comprising fluoropolymer S and fluoropolymer H wherein:
H is a fluoropolymer which comprises from 0 to 30 weight percent, preferably 15 to 30 weight percent, more preferably 20 to 30 weight percent of a monomer J selected from the group consisting of HFP, fluorinated or perfluorinated vinyl ethers, 2,3,3,3-tetrafluoropropene, trifluoropropene, 1-chloro-3,3,3-trifluoro propene or combinations thereof;
S preferably comprise at least 30 weight percent, at least 35 weight percent, preferable at least 40 weight percent, most preferably at least 43 weight percent of monomer T selected from the group consisting of hexafluoropropene (HFP), fluorinated or perfluorinated vinyl ethers, 2,3,3,3-tetrafluoropropene, trifluoropropene, 1-chloro-3,3,3-trifluoro propene or combinations thereof, wherein the amount of H is from 20 to 80 weight % of the composition, and the amount of S is from 20 to 80 weight % of the composition.

In the composition of the invention the weight percent of monomer T in S, is always at least 5% greater than the weight percent of monomer J in H.

In one embodiment, the invention provides for a composition comprising a fluoropolymer blend comprising fluoropolymer S and fluoropolymer H wherein:
a. H is a fluoropolymer comprising VDF and less than 30 weight percent HFP;
b. S is a fluoropolymer comprising greater than 35 weight percent HFP,
c. wherein the amount of H is from 20 to 80 weight % of the composition,
d. and the amount of S is from 20 to 80 weight % of the composition.

The composition of the invention can be an elastomer according to ASTM D412.

The invention also provides for articles made from the inventive composition.

In some embodiments the invention is particularly useful for injection molding.

Fluoropolymer H

The hard phase polymer, H, is a fluoropolymer which comprises from 0 to 30 weight percent, preferably 15 to 30 weight percent, more preferably 20 to 30 weight percent of a monomer J selected from the group consisting of HFP, fluorinated or perfluorinated vinyl ethers including perfluoromethyl ether (PMVE), perfluoroethylvinyl ether (PEVE), perfluoropropylvinyl ether (PPVE), perfluorobutylvinyl ether (PBVE), trifluoropropene, 1-chloro-3,3,3-trifluoro propene, longer chain perfluorinated vinyl ethers and 2,3,3, 3-tetrafluoropropene, or combinations thereof. Polymer H can be a homopolymer or a copolymer containing greater than 50 weight % fluoromonomers. In one embodiment H is preferably a homopolymer or a copolymer with from 70-100 weight % fluoromonomer and 0-30 weight % HFP and has a melt viscosity from 1-30 kP, preferably 4-20 kP as measured at 230° C. at 100 s$^{-1}$.

The hard phase fluoropolymers of the invention, H, include, but are not limited to polymers containing at least 50 weight percent of one or more fluoromonomers. The term "fluoromonomer" as used according to the invention means a fluorinated and olefinically unsaturated monomer capable of undergoing free radical polymerization reaction. Suitable exemplary fluoromonomers for use according to the invention include, but are not limited to, vinylidene fluoride (VDF), tetrafluoroethylene (TFE), trifluoroethylene (TrFE), chlorotrifluoroethylene (CTFE), vinyl fluoride (VF), hexafluoroisobutylene (HFIB), perfluorobutylethylene (PFBE), pentafluoropropene, 3,3,3-trifluoro-1-propene, 2-trifluoromethyl-3,3,3-trifluoropropene, 1,1-dichloro-1,1-difluoroethylene, 1,2-dichloro-1,2-difluoroethylene, 1,1,1,-trifluoropropene, 1,3,3,3-tetrafluoropropene, 1-chloro-3,3,3-trifluoropropene, fluorinated dioxoles, partially- or per-fluorinated alpha olefins of C4 and higher, partially- or per-fluorinated cyclic alkenes of C3 and higher, and fluorinated or partially fluorinated acrylates and methacrylates, and combinations thereof. Fluoropolymers used in the practice of the present invention include the products of polymerization of the fluoromonomers listed above, for example, the homopolymer made by polymerizing vinylidene fluoride (VDF) by itself, or a copolymer made by polymerizing vinylidene fluoride (VDF) with hexafluoropropene (HFP).

Fluoro-terpolymers are also contemplated, including terpolymers such as those having tetrafluoroethylene, hexafluoropropene and vinylidene fluoride monomer units. Most preferably the fluoropolymer is a polyvinylidene fluoride (PVDF) polymer homopolymer or copolymer. The invention will be exemplified in terms of PVDF, but one of ordinary skill in the art will recognize that other fluoropolymers could be represented where the term PVDF is exemplified.

Polymer H is preferable a polyvinylidene fluoride (PVDF) polymer. PVDF can be a homopolymer, copolymer or polymer alloy. Polyvinylidene fluoride polymers H of the invention include the homopolymer made by polymerizing vinylidene fluoride (VDF), and copolymers, terpolymers and higher polymers of vinylidene fluoride, where the vinylidene fluoride units comprise greater than 51 percent by weight, preferably 70 percent of the total weight of all the monomer units in the polymer, and more preferably, comprise greater than 75 percent of the total weight of the monomer units. Copolymers, terpolymers and higher polymers (generally referred to herein as "copolymers") of vinylidene fluoride may be made by reacting vinylidene fluoride with one or more monomers from the group consisting of vinyl fluoride, trifluoroethene, tetrafluoroethene, one or more of partly or fully fluorinated alpha-olefins such as 3,3,3-trifluoro-1-propene, 1,2,3,3,3-pentafluoropropene, 3,3,3,4,4-pentafluoro-1-butene, and hexafluoropropene, the partly fluorinated olefin hexafluoroisobutylene, perfluorinated vinyl ethers, such as perfluoromethyl vinyl ether, perfluoroethyl vinyl ether, perfluoro-n-propyl vinyl ether, and perfluoro-2-propoxypropyl vinyl ether, fluorinated dioxoles, such as perfluoro(1,3-dioxole) and perfluoro(2,2-dimethyl-1,3-dioxole), allylic, partly fluorinated allylic, or fluorinated allylic monomers, such as 2-hydroxyethyl allyl ether or 3-allyloxypropanediol, and ethene or propene, and fluorinated or partially fluorinated acrylates or methacrylates. Preferred copolymers or terpolymers are formed with vinyl fluoride, 2,3,3,3-tetrafluoropropene, trifluoroethene, tetrafluoroethene (TFE), and hexafluoropropene (HFP).

Preferred copolymers for polymer H include those comprising from about 70 to about 99 weight percent VDF, and correspondingly from about 1 to about 30 weight percent HFP, and preferably a level of HFP of 15 to 30 weight percent; terpolymers of VDF/HFP/TFE; and copolymers of VDF and TFE.

For polymer H, it is preferred that all monomer units be fluoromonomers, however, copolymers of fluoromonomers with non-fluoromonomers are also contemplated by the invention. In the case of a copolymer containing non-fluoromonomers, at least 60 percent by weight of the monomer units are fluoromonomers, preferably at least 70 weight percent, more preferably at least 80 weight percent, and most preferably at least 90 weight percent are fluoromonomers. Useful comonomers include, but are not limited to, ethylene, propylene, styrenics, acrylates, methacrylates, vinyl esters, vinyl ethers, non-fluorine-containing halogenated ethylenes, vinyl pyridines, and N-vinyl linear and cyclic amides.

Fluoropolymer S

The soft fluoropolymers of the invention S preferably comprises at least 35 weight percent, preferable at least 40 weight percent, most preferably at least 43 weight percent of monomer T selected from the group consisting of hexafluoropropene (HFP), fluorinated or perfluorinated vinyl ethers including perfluoromethyl ether (PMVE), perfluoroethylvinyl ether (PEVE), perfluoropropylvinyl ether (PPVE), perfluorobutylvinyl ether (PBVE), longer chain perfluorinated vinyl ethers and 2,3,3,3-tetrafluoropropene, trifluoropropene, 1-chloro-3,3,3-trifluoro propene or combinations thereof. Preferably the monomer T selected from the group is from 35 weight % to 70 weight %, preferably 40 to 70 weight percent, more preferably from 43 to 70 weight percent of S. The remaining weight percent is preferably made up of other fluoromonomers. The term "fluoromonomer" as used according to the invention means a fluorinated and olefinically unsaturated monomer capable of undergoing free radical polymerization reaction. Suitable exemplary fluoromonomers for use according to the invention include, but are not limited to, vinylidene fluoride (VDF), tetrafluoroethylene (TFE), trifluoroethylene (TrFE), chlorotrifluoroethylene (CTFE), vinyl fluoride (VF), hexafluoroisobutylene (HFIB), perfluorobutylethylene (PFBE), pentafluoropropene, 3,3,3-trifluoro-1-propene, 2-trifluoromethyl-3,3,3-trifluoropropene, 1,1-dichloro-1,1-difluoroethylene, 1,2-dichloro-1,2-difluoroethylene, 1,1,1,-trifluoropropene, 2,3,3,3-tetrafluoropropene, 1,3,3,3-tetrafluoropropene, 1-chloro-3,3,3-trifluoropropene, fluorinated dioxoles, partially- or per-fluorinated alpha olefins of C4 and higher, partially- or per-fluorinated cyclic alkenes of C3 and higher, fluorinated or perfluorinated vinyl ethers including perfluoromethyl ether (PMVE), perfluoroethylvinyl ether (PEVE), perfluoropropylvinyl ether (PPVE), perfluorobutylvinyl ether (PBVE), longer chain perfluorinated vinyl ethers, and fluorinated or partially fluorinated acrylates and methacrylates, and combinations thereof. Fluoropolymer S used in the practice of the present invention include the products of polymerization of the fluoromonomers listed above, for example, a copolymer made by polymerizing vinylidene fluoride (VDF) with hexafluoropropene (HFP).

Fluoro-terpolymers are also contemplated, including terpolymers such as those having tetrafluoroethylene, hexafluoropropene and vinylidene fluoride monomer units.

Polymer S is preferable a vinylidene fluoride (VDF) hexafluoropropene (HFP) copolymer. S can be a copolymer or polymer alloy. Polyvinylidene fluoride polymers S of the invention include the copolymers, terpolymers and higher polymers of hexafluoropropene (HFP), where the hexafluoropropene (HFP) units comprise greater than 35 percent by weight, preferably 40 percent, more preferably 43 weight percent of the total weight of all the monomer units in the polymer. The HFP monomers unit can comprise as much as 70 weight percent of the total weight of all the monomer units in the polymer S. Copolymers, terpolymers and higher polymers (generally referred to herein as "copolymers") of vinylidene fluoride may be made by reacting vinylidene fluoride with one or more monomers from the group consisting of vinyl fluoride, trifluoroethene, tetrafluoroethene, one or more of partly or fully fluorinated alpha-olefins such as 3,3,3-trifluoro-1-propene, 1,2,3,3,3-pentafluoropropene, 3,3,3,4,4-pentafluoro-1-butene, and hexafluoropropene, the partly fluorinated olefin hexafluoroisobutylene, perfluorinated vinyl ethers, such as perfluoromethyl vinyl ether, perfluoroethyl vinyl ether, perfluoro-n-propyl vinyl ether, and perfluoro-2-propoxypropyl vinyl ether, fluorinated dioxoles, such as perfluoro(1,3-dioxole) and perfluoro(2,2-dimethyl-1,3-dioxole), allylic, partly fluorinated allylic, or fluorinated allylic monomers, such as 2-hydroxyethyl allyl ether or 3-allyloxypropanediol, and ethene or propene. Preferred copolymers or terpolymers are formed with vinyl fluoride, trifluoroethene, tetrafluoroethene (TFE), and hexafluoropropene (HFP).

Preferred copolymers for polymer S include those comprising from about 35 to about 70 weight percent HFP, and correspondingly from about 65 to about 30 weight percent VDF, and preferably a level of HFP of 40 to 55 weight percent; terpolymers of VDF/HFP/TFE; and copolymers of VDF and TFE.

In one embodiment of the invention, for polymer S, it is preferred that all monomer units be fluoromonomers, however, copolymer of fluoromonomers with non-fluoromonomers are also contemplated by the invention. In the case of a copolymer containing non-fluoromonomers, at least 60 percent by weight of the monomer units are fluoromonomers, preferably at least 70 weight percent, more preferably at least 80 weight percent, and most preferably at least 90 weight percent are fluoromonomers. Useful comonomers include, but are not limited to, ethylene, propylene, styrenics, acrylates, methacrylates, vinyl esters, vinyl ethers, non-fluorine-containing halogenated ethylenes, vinyl pyridines, and N-vinyl linear and cyclic amides.

Polymer S has a melt viscosity of from 10-55 kP, preferably 15-55 kP, more preferably 20-50 kP, even more preferably 25-50 kP, most preferably 30-50 kP.

In a preferred embodiment, the soft phase polymer S comprises greater than 30 weight percent, preferably greater than 35 weight percent, HFP and up to 70 weight percent HFP, more preferably from greater than 40% to 70 weight % HFP.

In one embodiment S is a copolymer of 30-65 weight % VDF (vinylidene fluoride) and 35-70 weight % HFP with a viscosity from 10-55 kP, preferably 15-55 kP, more preferably 20-50 kP, even more preferably 25-50 kP, most preferably 30-50 kP.

Production of fluoropolymer is well known to those of skill in the art. The fluoropolymer can be produced via suspension polymerization, emulsion polymerization, solution polymerization, bulk polymerization, or solution assisted suspension or emulsion polymerization.

The reaction to produce the Latex for polymer H and polymer S are known to those skilled in the art and by example are disclosed in, for example, U.S. Pat. Nos. 4,360,652, 6,869,997, 8,080,621, 8,158,734, 8,697,822, 8,765,890 and many others, the contents of such patents are herein incorporated by reference.

Other Additives

The fluoropolymer composition of the invention may also include typical additives, including, but not limited to, dyes; pigments; colorants; impact modifiers; antioxidants; flame-retardants; ultraviolet stabilizers; flow aids; conductive additives such as metals, carbon black and carbon nanotubes; defoamers; waxes; solvents; rheology modifiers such as plasticizers; surfactants; fillers (including nanofillers), and anti-static agents. Other additives that provide whitening could also be added to the fluoropolymer composition, including, but not limited to metal oxide fillers, such as zinc oxide; phosphate or phosphite stabilizers; and phenolic stabilizers. Any residual additives used for synthesizing the at least one fluoropolymer H or S or other polymers which may be present Plasticizers are defined in the Encyclopedia of Polymer Science and Engineering (Wiley and Sons, 1989), on p. 568-569 and p. 588-593. They can be monomeric or polymeric. Dibutyl-sebacate, dioctyl-phthalate, N-n-butylsulfonamide, polymeric polyesters and combinations thereof are examples of suitable plasticizers. Suitable polymeric polyesters may be for example derived from adipic, azelaic or sebacic acids and diols and combinations thereof. Their molecular weight is preferably at least 1500 g/mol, more preferably at least 1800 g/mol.

When additives are present, they are preferably present in an amount of from 0.1 to 10 weight. % in the composition, more preferably of from 0.2 to 5 weight. %, and most preferably of from 0.5 to 3 weight. %.

Properties

If the polymers are synthesized via emulsion polymerization, the solids level in the latexes used in the invention is preferably greater than 20 weight percent, preferably greater than 26 weight percent, more preferably greater than 28 weight percent, more preferably greater than 30 weight percent, and even more preferably greater than 35 weight percent. Weight percent solids of greater than 40 weight percent and even greater than 50 weight percent are contemplated. A preferred solids range is from 26 to 40 weight percent solids, and more preferably from 28 to 35 weight percent.

It is possible to employ multinuclear NMR techniques, such as proton (1H) and fluorine (19F) NMR, and to analyze a solution of the fluoropolymer H or S in an appropriate deuterated solvent. The NMR spectrum is recorded on an FT-NMR spectrometer equipped with a multinuclear probe. Specific signals resulting from different units in the produced spectra are then identified. For example, TrFE-derived units, if present, result, in proton NMR, in a specific signal characteristic of the CFH group (at approximately 5 ppm). The same applies to the $CH_2$ groups of VDF-derived units (unresolved peak centered at 3 ppm). The relative integration of the two signals gives access to the relative abundance of the two monomers, that is to say the VDF/TrFE molar ratio (if TrFE-derived units are present).

Similarly, a $CF_3$ group as is present in HFP-derived units results in a characteristic and well-isolated signal in fluorine NMR. The combination of the relative integrations of the different signals obtained in proton NMR and/or in fluorine NMR results in a system of equations, the solution of which provides the molar proportions of the different units in the fluoropolymer (from which the weight proportions may be calculated).

Document U.S. Pat. No. 6,586,547 provides an example of how NMR may be used to determine the content of HFP-derived units in a P(VDF-HFP) copolymer.

Finally, it is possible to combine the elemental analysis, for example for heteroatoms such as chlorine or bromine, and the NMR analysis.

The (or each) fluoropolymer S or H of the invention is preferably a statistical (random), linear polymer.

The at least one fluoropolymer S (i.e. either the single fluoropolymer S or the mixture of fluoropolymers S) is preferably an elastomer.

By "elastomer" is herein meant a material having an elastic recovery of at least 80%, preferably at least 90%, when subjected to a stress/relaxation protocol according to ASTM standard D412. This protocol is applied on a tensile bar defined by ASTM D638. This sample is submitted to a tensile deformation of 100% applied at 25° C. 100% deformation is maintained for 5 minutes and the sample is then released. After 5 minutes of relaxation the residual deformation is measured. The elastic recovery is defined as the initial sample length minus the residual deformation. The tensile protocol is carried out with an Instron model 4201, 4202 or the like equipped with a 100 or 200 lb load cell.

The at least one fluoropolymer S (i.e. either the single fluoropolymer S or the mixture of fluoropolymers S) preferably has low or no crystallinity, which is characterized by a heat of fusion calculated from the first endotherm detected in a differential scanning calorimeter (DSC) scan of less than 20 J/g, preferably less than 15 J/g and even more preferably less than 10 J/g. DSC scans are performed according to ASTM D 451-97 using a DSC apparatus. The instrument is equipped with a dry box with a nitrogen purge through the dry box. Specimens of 9 to 10 mg are used and crimped in aluminum pans. The DSC run typically is begun at −50° C., followed by a 10° C./min ramp to 210° C.

In the context of the present application, unless otherwise indicated, all viscosities are melt viscosities which are measured at a temperature of 230° C. and at a shear rate of $100\ s^{-1}$. More specifically, melt viscosities may be measured by a Dynisco LCR 7000 capillary rheometer. Measurements are performed at 230° C. with shear rates ranging from 10 to $3000\ s^{-1}$, with the viscosity recorded at $100\ s^{-1}$.

If more than one fluoropolymer S is present in the composition, the viscosity values mentioned herein are those of the corresponding mixture of fluoropolymers S, in the same relative proportions as would be in the composition.

If more than one fluoropolymer H is present in the composition, the viscosity values mentioned herein are those of the corresponding mixture of fluoropolymers H, in the same relative proportions as would be in the composition.

The molecular weight of fluoropolymers may be difficult to accurately determine, when it is relatively high. Therefore, in the present application, it is more convenient and more accurate to indirectly characterize the molecular weight of fluoropolymer H and the fluoropolymer S by referring to their overall melt viscosity respectively.

The weight average molecular weight of the fluoropolymer H of the invention generally range from 50,000 to 600,000 g/mol with dispersities of ~2.0 to 4.0.

The weight average molecular weight of the fluoropolymer S of the invention generally range from 50,000 to 1,000,000 g/mol with dispersities of ~2.0 to 4.0.

Uses

Articles or parts made from the composition may find use as wearable bands, soft seals (as in virtual reality constructs), buttons and other features on remote controls, handles, flexible electronic housing, casing, pads, belts and biometric devices in the consumer electronics field. Specifically, the article or part formed into a band would be well suited for smart watch and other biometric band applications where weather resistance, stain resistance and soft touch are important. Specifically, such parts made from the composition will have high stain resistance and a soft feel without the need of an additional coating such as a silicone.

Articles or parts made from the composition would also find uses in applications typical of thermoplastic elastomers or crosslinked elastomers, such as seals, gaskets or hoses. Such articles or articles can be made by injection molding with little shrinkage (less than 5%).

The composition of the invention may be initially produced in a solid form, such as a powder, granules, pellets or crumbs. Then, it can be processed so as to be shaped into solid articles or article parts, as further described below.

The density of the formed article is preferably from 1.6 to 2.0, more preferably from 1.7 to 1.9. Therefore, the density of the composition is preferably lower than that of a typical crosslinked fluoroelastomer, which makes it possible to afford savings in the manufacturing process. On the other hand, the density of the composition is sufficiently high to achieve a perception of quality by the consumer, when the composition is used for making an article or article part as described below.

The composition of the invention is preferably characterized by one or more, and preferably all, of the following parameters:
  a) deformation at break of more than 300%, preferably more than 350%, more preferably more than 400%, most preferably more than 450% (measured at 25° C. and at a rate of 25 mm/min, according to ISO 527);
  b) hardness of less than 90 Shore A, preferably of less than 85 Shore A, measured according to ISO 868;
  c) elastic recovery of at least 80%, preferably at least 85%, more preferably at least 90% when exposed to the stress relaxation protocol as defined in ASTM standard D412 (accordingly, the composition of the invention is preferably an elastomer composition as defined above).

Articles or Parts Made of the Composition

The copolymers S and H can be blended as latex, then isolated to the form of a powder, granule, pellet, crumb, or slab. In the alternative, H and S can be isolated from latex individually, and then blended.

The copolymers S and H can be blended from suspension, then isolated to the form of a powder, granule, pellet, crumb, or slab. In the alternative, H and S can be isolated from suspension individually, and then blended.

Starting from e.g. a powder, granules, pellets or crumbs or slabs of the composition of the invention, various articles or parts may be manufactured.

Alternatively, articles may be manufactured by making the composition of the invention (for instance by blending S and H with one or more additional components) and directly producing this composition in the form of an article or article part.

In some embodiments, the articles made according to the invention consist of the composition of the invention. In other embodiments, said articles comprise one or more parts consisting of the composition of the invention, and one or more additional parts. For instance, the composition of the invention can be present as one or more layers in a multilayer article.

The articles or article parts of the invention can be manufactured by a process comprising at least one step of shaping the composition of the invention into a desired shape.

Preferably, said shaping is performed by softening the composition by subjecting it to a relatively high temperature, preferably mixing it, supplying the desired shape to the softened composition and cooling down.

The temperature at which the composition is softened is preferably from 100 to 260° C., more preferably from 150 to 260° C. and even more preferably from 200 to 260° C.

Most preferably, no crosslinking or curing of the composition takes place during the step of shaping and cooling down.

Preferably, no crosslinking or curing of the composition takes place during the entire manufacturing process, so that the composition is not crosslinked or cured in the article or article part.

The shaping step can be an extrusion step, or a hot pressing step, or a molding step, such as an injection molding step or a compression molding step.

A compression molding step for instance can consist in applying high pressure for a couple of minutes at the above temperature to provide the desired shape to the article or article part, and then cool down the material for e.g. 3 to 5 minutes to allow demolding.

Injection molding can be performed in the same temperature range at low speed in a mold maintained at 30-70° C.

The composition of the invention may optionally be shaped on a preexisting part (e.g. by overmolding).

Optionally, an additional part of the article may be shaped on the shaped composition of the invention (e.g. by overmolding). This additional part may optionally be also made of the composition of the invention.

Alternatively, two or more parts of the article may be made separately assembled by any known technique such as gluing.

As an alternative to the above thermoplastic processing techniques, the composition of the invention can also be suspended and/or dissolved in a liquid vehicle so as to form an ink, which is then deposited on a surface, before evaporating the liquid vehicle.

The liquid vehicle is preferably a solvent. More preferably, it is selected from dimethylformamide, dimethylacetamide, dimethylsulfoxide, ketones, such as acetone, methylethylketone, methylisobutylketone and cyclopentanone, furans, such as tetrahydrofurane, esters, such as methyl acetate, ethyl acetate, propyl acetate, butyl acetate and propylene glycol methyl ether acetate; carbonates, such as dimethylcarbonate, phosphates, such as 1e triethylphosphate. Mixtures of these compounds may also be used.

The total weight concentration of the polymer blend in the liquid vehicle may in particular be from 0.1 to 30%, preferably from 0.5 to 20%.

The ink may in particular be deposited on a glass surface or silicon surface or polymer surface or metal surface. Said deposition may be notably performed by spin-coating, spray coating, bar coating, dip coating, roll-to-roll printing, serigraphy printing, lithography printing or ink-jet printing.

Preferably, no coating, and in particular no silicone-based coating is provided on top of the articles or article parts made of the composition of the invention.

Preferably, the articles or article parts made of the composition of the invention are not coatings themselves.

Accordingly, the articles or article parts made of the composition of the invention preferably have a minimum dimension of at least 100 µm, preferably at least 200 µm, or at least 500 µm, or at least 1 mm, or at least 2 mm.

Said minimum dimension may in particular be a length, a width, a depth, a thickness or a diameter.

For instance, for a band-like or plate-like article, the minimum dimension is the average thickness; for a substantially elongated cylindrical article, the minimum dimension is the average diameter of the cylinder; etc.

The articles of the invention may in particular be selected from wearable articles and consumer electronics articles.

In particular embodiments, they are intended to be in contact with the human body and more specifically with human skin.

Preferred examples include supports for sensors, supports for electronic devices, casings, belts, gloves, pads, strips and bands.

Examples

Hard fluoropolymer H and Soft fluoropolymer S are blended at the indicated weight % in a static mixer at 230° C. for 10-60 min.

Example [1] polymers H and S are blended as latex and isolated by freezing, then grinding directly or with water in a commercial blender. Polymer H is a copolymer with 26 weight % HFP and 74 weight % VDF with a viscosity of 5 kP, and S is 50 weight % HFP and 50 weight % VDF with a viscosity of 40 kP.
(a) 33 weight % S, 67 weight % H
(b) 50 weight % S, 50 weight % H
(c) 67 weight % S, 33 weight % H Example [2] is the same as [1] but polymer H is a copolymer with 26 weight % HFP and 74 weight % VDF with a viscosity of 10 kP, and S is 50 weight % HFP and 50 weight % VDF with a viscosity of 40 kP.
(a) 33 weight % S, 67 weight % H
(b) 50 weight % S, 50 weight % H
(c) 67 weight % S, 33 weight % H Example [3] is the same as [1] but polymer H is a copolymer with 26 weight % HFP and 74 weight % VDF with a viscosity of 20 kP, and S is 50% HFP and 50% VDF with a viscosity of 40 kP. The blend is 50 weight % S.

Example [4] is the same as [1] but polymer H is a copolymer with 26 weight % HFP and 74 weight % VDF with a viscosity of 5 kP, and S is 50 weight % HFP and 50 weight % VDF with a viscosity of 20 kP.
(a) 33 weight % S, 67 weight % H
(b) 50 weight % S, 50 weight % H
(c) 67 weight % S, 33 weight % H Mechanical Properties Tensile properties were measured according to ASTM D638 for each example. Tensile set is reported after subjecting tensile bars to the procedure described above and by ASTM standard D412. Shore A hardness was measured according to ASTM D2240.

TABLE 1

Summary of mechanical properties

| Example | Young's Modulus (MPa) | Elongation at break (%) | Tensile Set (%) | Hardness (Shore A) |
|---|---|---|---|---|
| 1a | 23 | >1000 | 15.4 | 88 |
| 1b | 13 | >1000 | 10.4 | 79 |
| 1c | 6 | >1000 | 4.9 | 69 |
| 2a | 23 | >1000 | 17.2 | 86 |
| 2b | 14 | >1000 | 12.7 | 78 |
| 2c | 7 | >1000 | 5.8 | 68 |
| 3 | 13 | >1000 | 12.5 | 78 |
| 4a | 24 | >1000 | 21.7 | 81 |
| 4b | 12 | >1000 | 19.9 | 74 |
| 4c | 6 | >1000 | 19.6 | 64 |

Morphology

Figure 1:
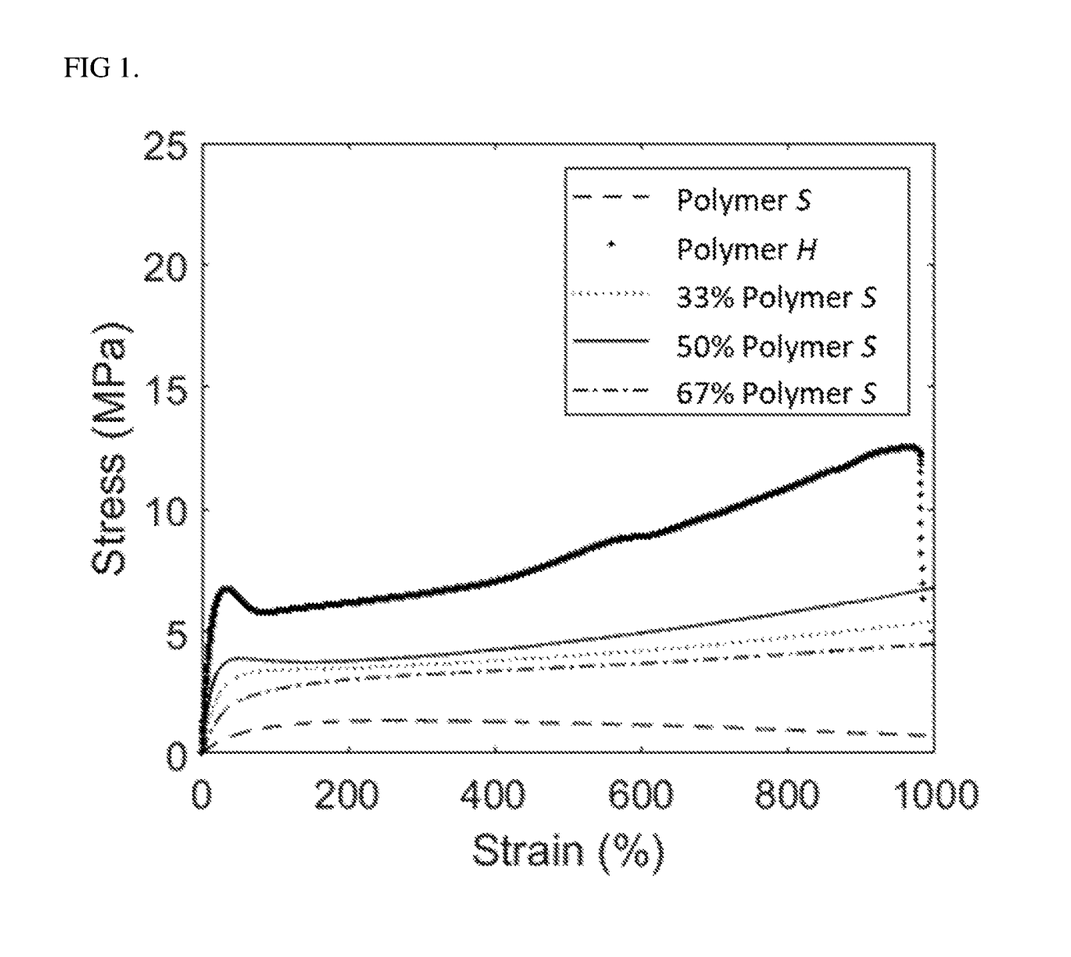
FIG. 1 Stress strain curves for example 1.
Figure 2:
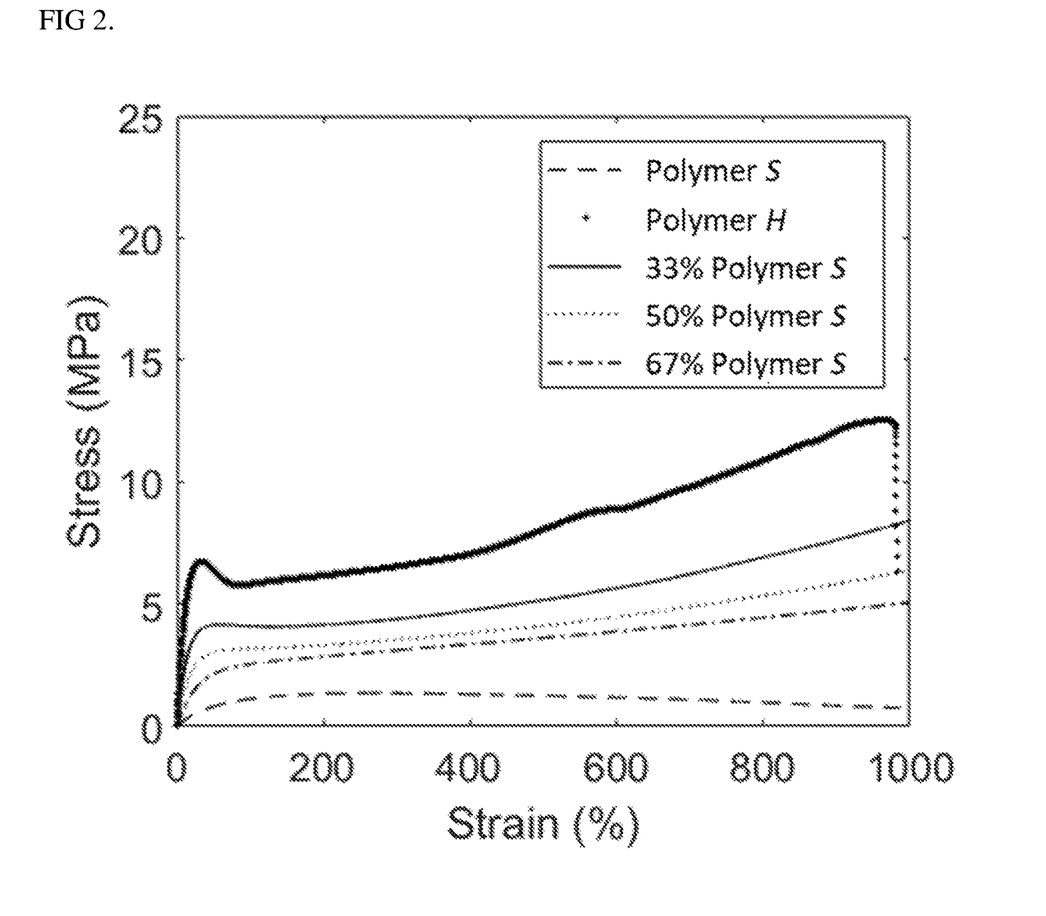
FIG. 2 Stress strain curves for example 2.
Figure 3:
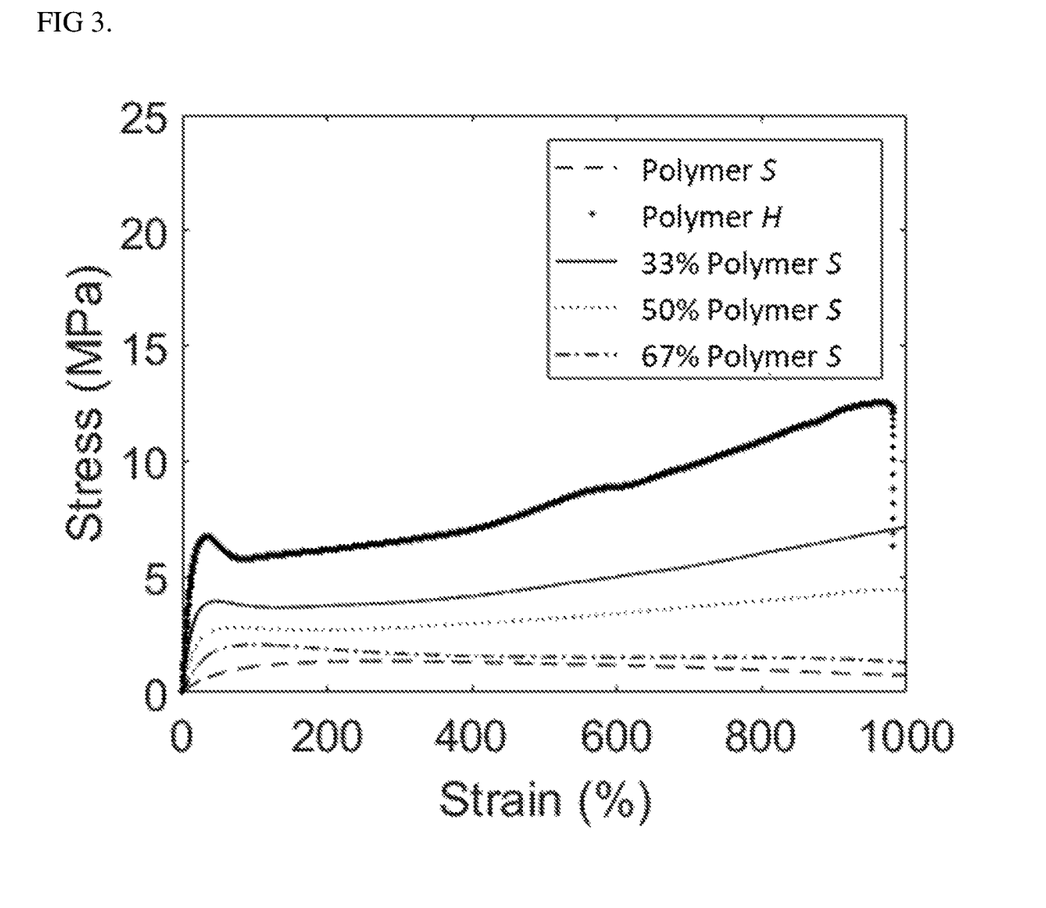
FIG. 3 Stress strain curves for example 4.
Figure 4:
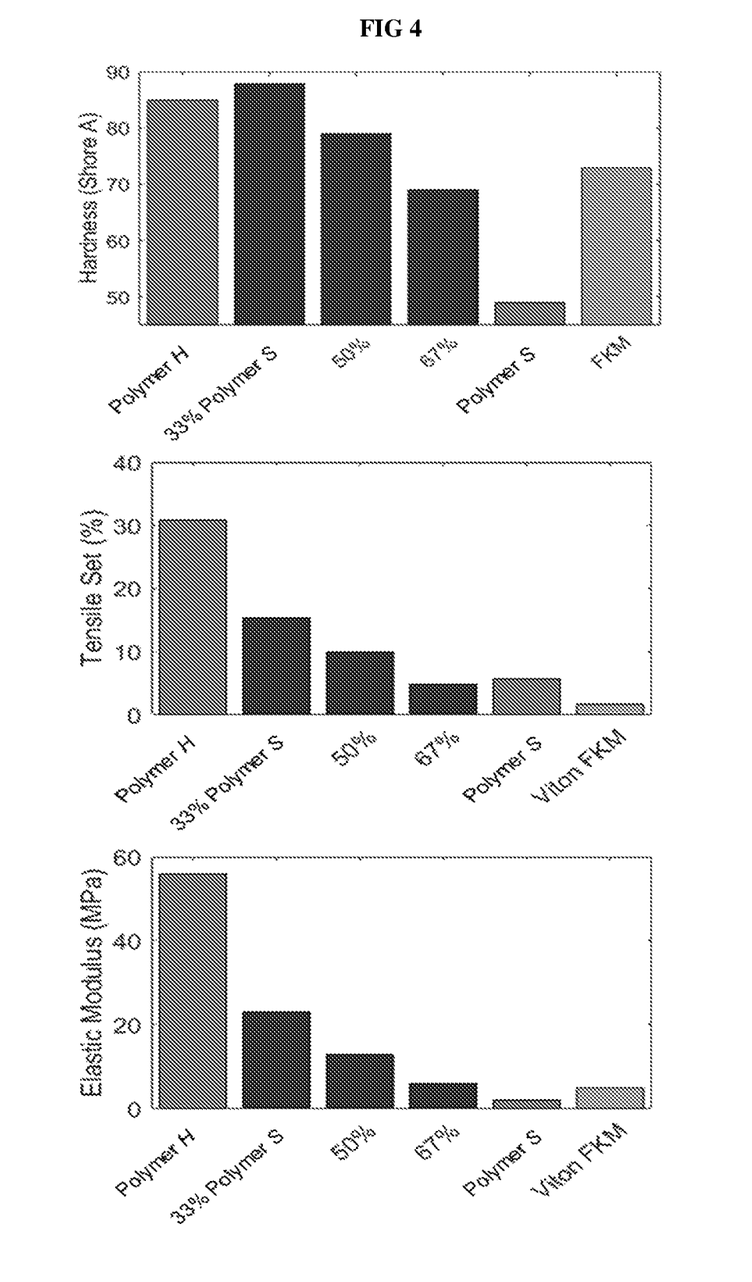
FIG. 4 Mechanical property summary of example 1.
Figure 5:
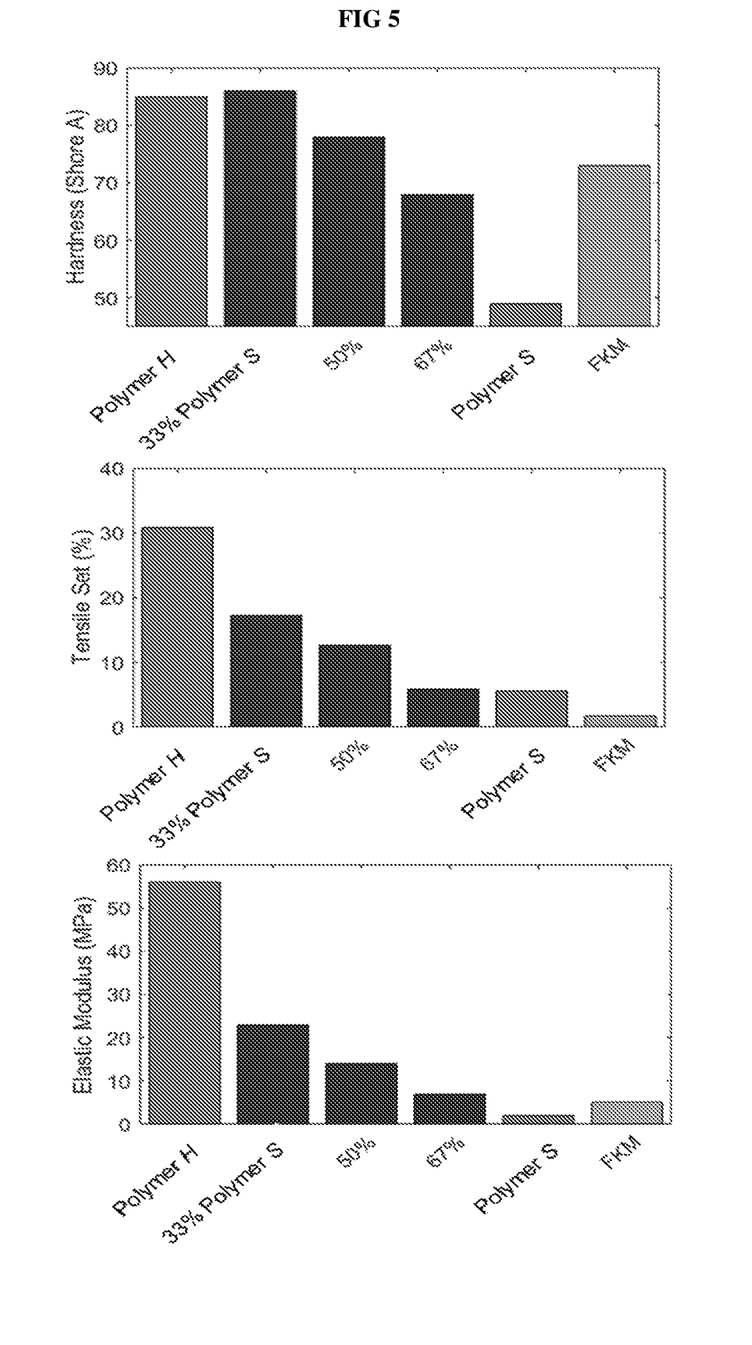
FIG. 5 Mechanical property summary of example 2.
Figure 6:
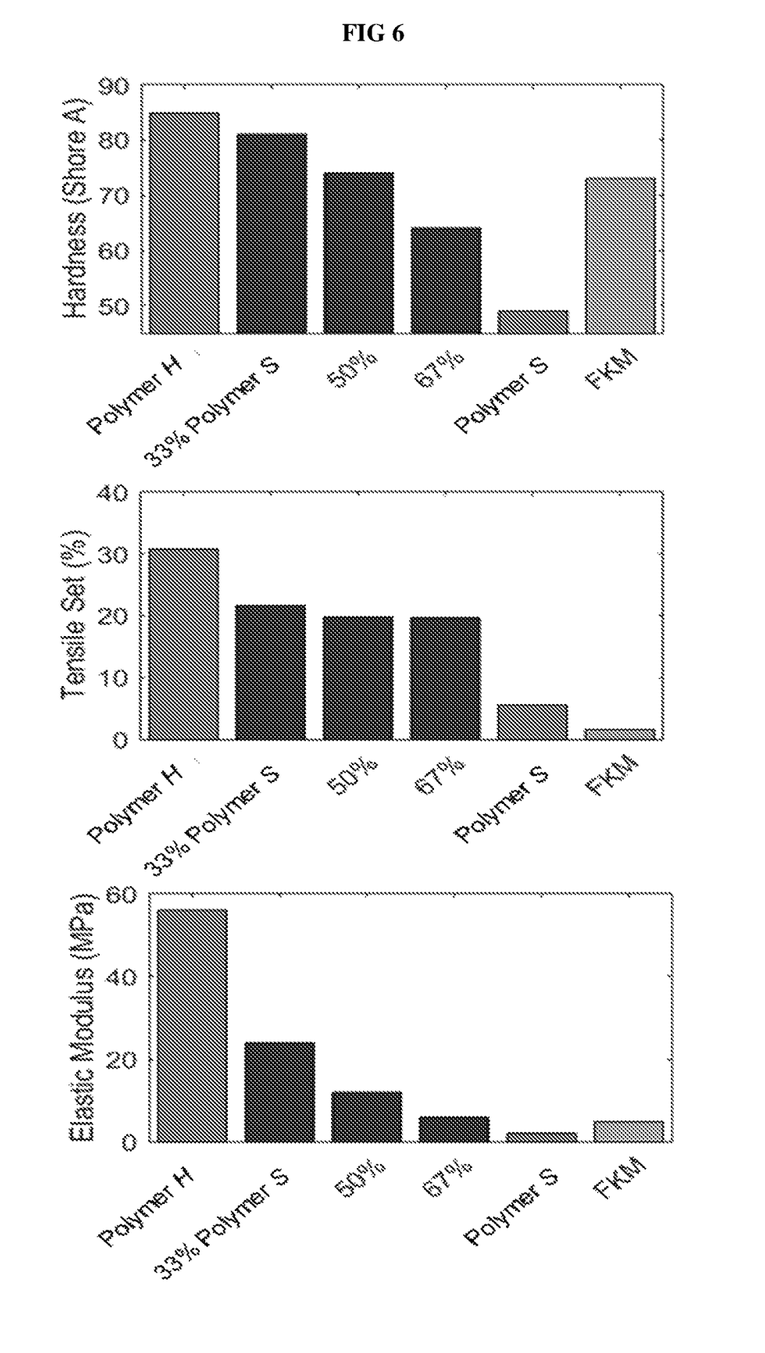
FIG. 6 Mechanical property summary of example 4.
Figure 7:
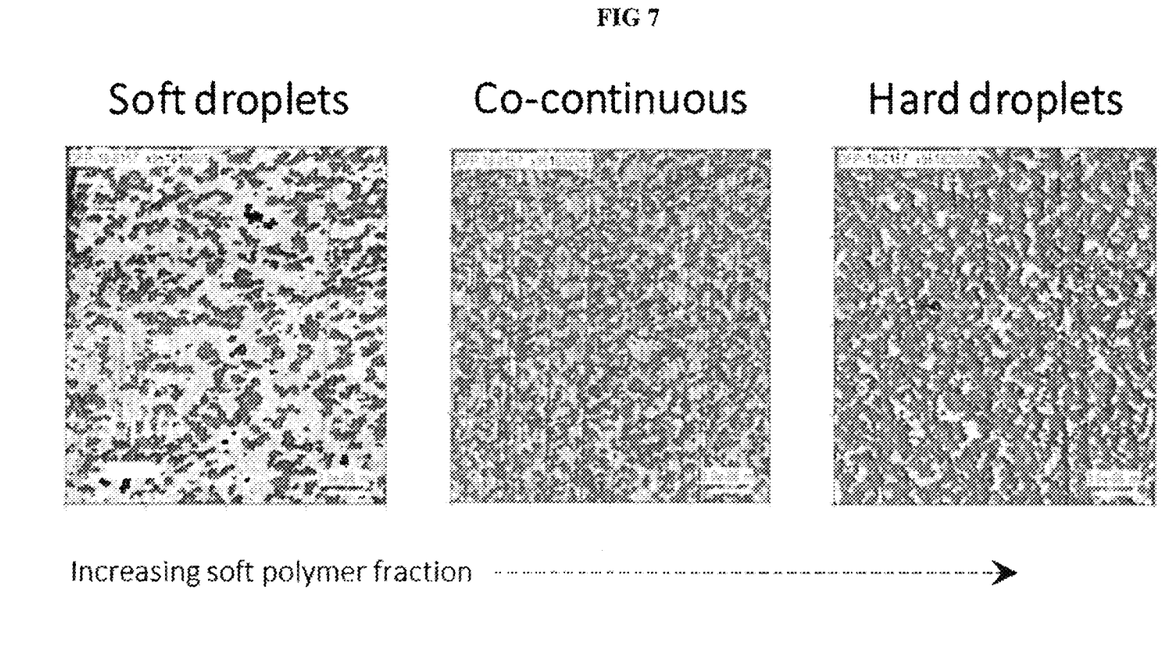
FIG. 7 Morphology of example 1 via AFM.
Figure 8:
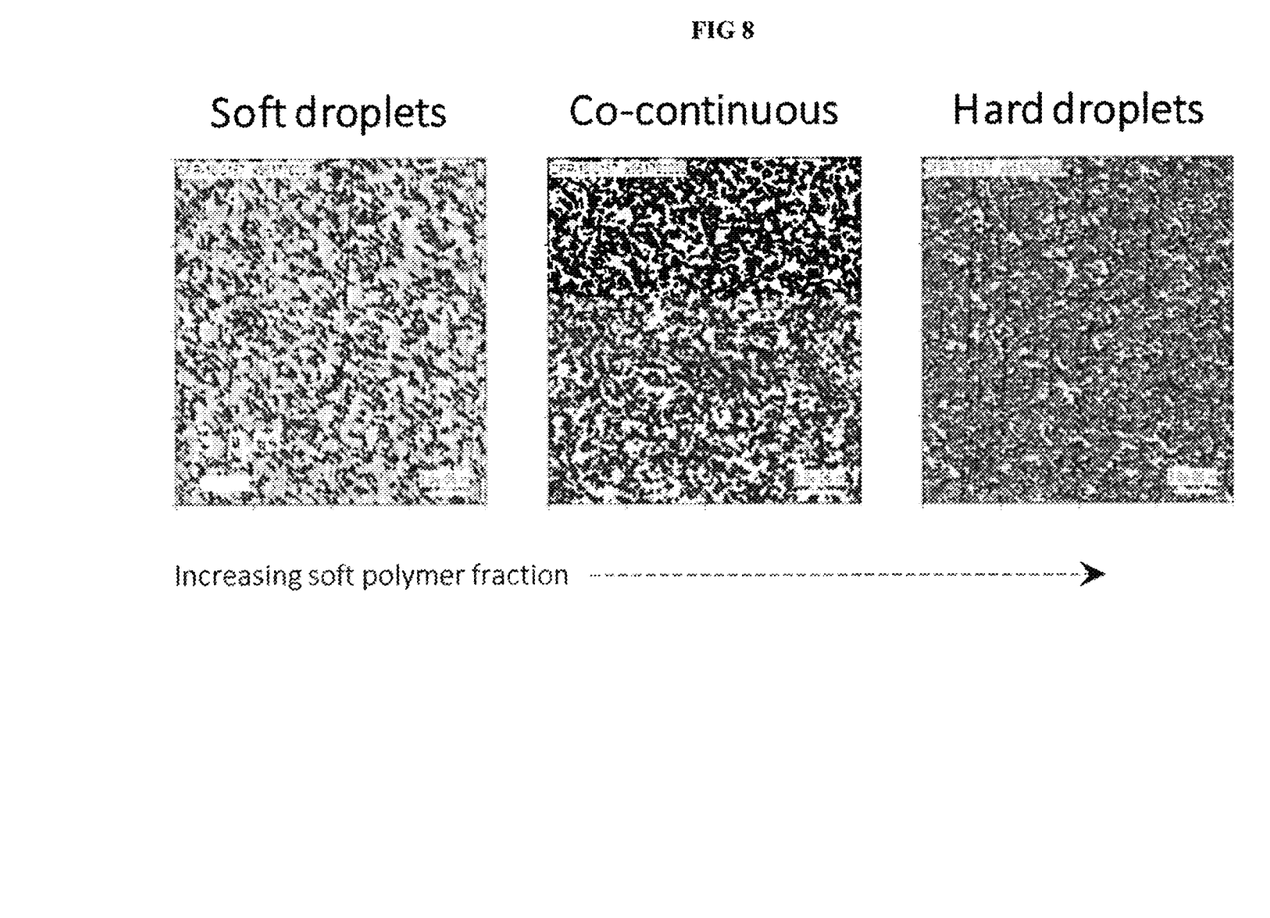
FIG. 8 Morphology of example 2 via AFM.
Figure 9:
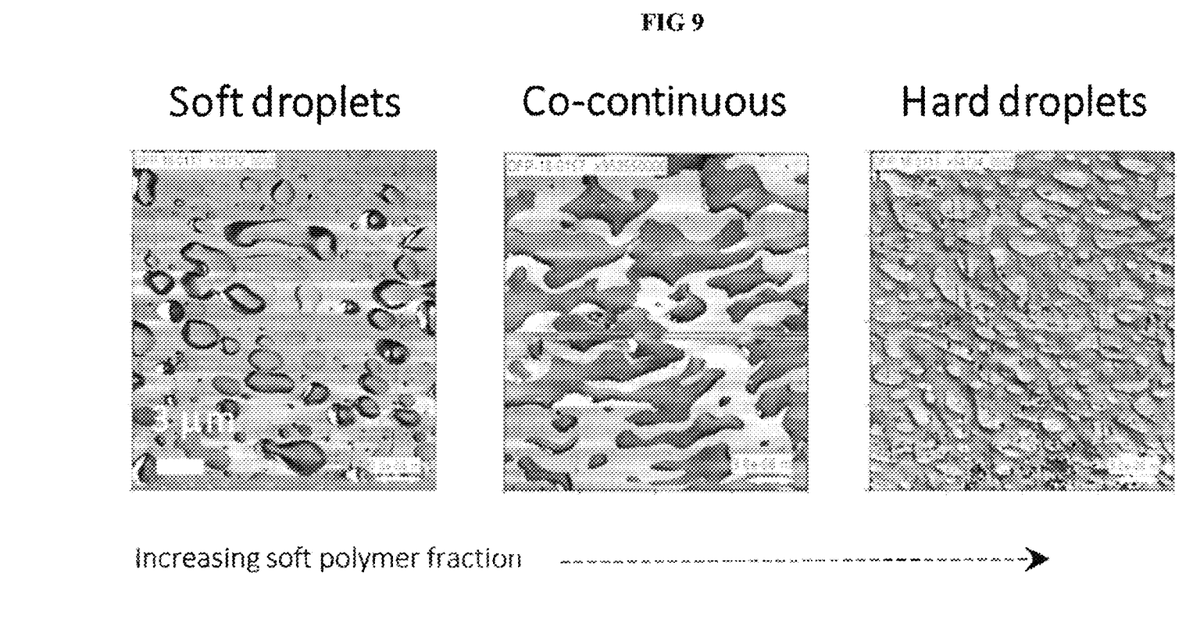
FIG. 9 Morphology of Example 4 via AFM.

Atomic force microscopy (AFM) is performed with a MFP3D AFM from Oxford Instruments and an ME600 optical microscope from Nikon. The samples were trimmed and microtomed before imaging. The trimming was done using an Ultramicrotome from Boeckeler Instruments (Powertome X). The microtoming was done with glass and diamond knives at a temperature of −1200 C using a RMC 990 rotary microtome. FIGS. 7, 8 and 9.

Shrinkage

TABLE 2

Shrinkage of Example 1 after injection molding*

| Example | Shrinkage** after 3 days at 25° C. (%) |
|---|---|
| 1a | 0.3 |
| 1b | 0.9 |
| 1c | 3.0 |

*Injection molded pellets of each composition at 180° C. barrel and 40° C. mold temperatures.
**Shrinkage was measured as length change from mold length of 165 mm of ASTM standard Type I tensile bars as measured with calipers with a sensitivity of at least 0.1 mm.

The invention claimed is:

1. A fluoropolymer composition comprising a fluoropolymer blend comprising fluoropolymer S and fluoropolymer H wherein:
H comprises greater than 51 wt % vinylidene fluoride and from 15 to 30 weight percent, of a monomer J selected from the group consisting of hexafluoropropene (HFP), fluorinated or perfluorinated vinyl ethers, 2,3,3,3-tetrafluoropropene, trifluoropropene, 1-chloro-3,3,3-trifluoro propene or combinations thereof;
S comprises at least 35 weight percent, of monomer T selected from the group consisting of hexafluoropropene (HFP), fluorinated or perfluorinated vinyl ethers, 2,3,3,3-tetrafluoropropene, trifluoropropene, or combinations thereof, and
wherein, the amount of H is from 20 to 80 weight % of the composition, and the amount of S is from 80 to 20 weight % of the composition.

2. A fluoropolymer composition comprising a fluoropolymer blend comprising fluoropolymer S and fluoropolymer H wherein:
H comprises greater than 51 wt % vinylidene fluoride and from 15 to 30 weight percent, of a monomer J selected from the group consisting of hexafluoropropene (HFP), fluorinated or perfluorinated vinyl ethers, 2,3,3,3-tetrafluoropropene, trifluoropropene, 1-chloro-3,3,3-trifluoro propene or combinations thereof;
S comprises at least 30 weight percent, of monomer T selected from the group consisting of hexafluoropropene (HFP), fluorinated or perfluorinated vinyl ethers, 2,3,3,3-tetrafluoropropene, trifluoropropene, or combinations thereof, and
wherein, the amount of H is from 20 to 80 weight % of the composition, and the amount of S is from 80 to 20 weight % of the composition,
with the proviso that the weight percent of said monomer T in S is always at least 5% greater than the weight percent of said monomer J in H.

3. The fluoropolymer composition of claim 1, wherein said fluoropolymer composition is an elastomer having an elastic recovery of at least 80%, when subjected to a stress/relaxation protocol according to ASTM standard D412.

4. The fluoropolymer composition of claim 1, wherein the melt viscosity of H is from 1-30 kP as measured at 230° C. at 100 s$^{-1}$.

5. The fluoropolymer composition of, wherein the melt viscosity of S is from 10-55 kP as measured at 230° C. at 100 s$^{-1}$.

6. The fluoropolymer composition of claim 1, wherein H comprises at least one monomer selected from the group consisting of tetrafluoroethylene (TFE), trifluoroethylene (TrFE), chlorotrifluoroethylene (CTFE), hexafluoropropene (HFP), vinyl fluoride (VF), hexafluoroisobutylene (HFIB), perfluorobutylethylene (PFBE), pentafluoropropene, 3,3,3-trifluoro-1-propene, 2-trifluoromethyl-3,3,3-trifluoropropene, 1,1-dichloro-1,1-difluoroethylene, 1,2-dichloro-1,2-difluorethylene, 1,1,1,-trifluoropropene, 1,3,3,3-tetrafluoropropene, 2,3,3,3-tetrafluoropropene, 1-chloro-3,3,3-trifluoropropene, fluorinated or perfluorinated vinyl ethers, fluorinated dioxoles, partially- or per-fluorinated alpha olefins of C4 and higher, partially- or per-fluorinated cyclic alkenes of C3 and higher, fluorinated or partially fluorinated acrylates and methacrylates, and combinations thereof.

7. The fluoropolymer composition of claim 1, wherein S comprises at least one monomer selected from the group consisting of vinylidene fluoride (VDF), tetrafluoroethylene (TFE), trifluoroethylene (TrFE), chlorotrifluoroethylene (CTFE), hexafluoropropene (HFP), vinyl fluoride (VF), hexafluoroisobutylene (HFIB), perfluorobutylethylene (PFBE), pentafluoropropene, 3,3,3-trifluoro-1-propene, 2-trifluoromethyl-3,3,3-trifluoropropene, 1,1-dichloro-1,1-difluoroethylene, 1,2-dichloro-1,2-difluorethylene, 1,1,1,-trifluoropropene, 1,3,3,3-tetrafluoropropene, 2,3,3,3-tetrafluoropropene, 1-chloro-3,3,3-trifluoropropene, fluorinated or perfluorinated vinyl ethers, fluorinated dioxoles, partially- or per-fluorinated alpha olefins of C4 and higher, partially- or per-fluorinated cyclic alkenes of C3 and higher, fluorinated or partially fluorinated acrylates and methacrylates, and combinations thereof.

8. The fluoropolymer composition of claim 1, wherein fluoropolymer H is a copolymer of VDF and HFP wherein the VDF comprises at least 70 weight percent of H.

9. The fluoropolymer composition of claim 1, wherein fluoropolymer S is a copolymer of VDF and HFP wherein the HFP comprises at least 30 weight percent of S.

10. The fluoropolymer composition of claim 1, wherein the total proportion of fluoropolymer(s) H plus S in the composition is at least 85 weight.

11. The fluoropolymer composition of claim 1, wherein the melt viscosity of the fluoropolymer blend, S plus H, is from 1000 to 4400 Pa·s, at a temperature of 230° C. and at a shear rate of 100 s$^{-1}$.

12. The fluoropolymer composition of claim 1, wherein the fluoropolymer composition is recyclable.

13. The fluoropolymer composition of claim 1, wherein the morphology is droplets of S in a matrix of H.

14. The fluoropolymer composition of claim 1, wherein the morphology is co-continuous, where both S and H are percolated through the network.

15. The fluoropolymer composition of claim 1, wherein the morphology is droplets of H in a matrix of S.

16. An article comprising the fluoropolymer composition of claim 1.

17. The article of claim 16, wherein the total proportion of fluoropolymer(s), S plus H, in the article is at least 85 weight.

18. A process of making the article of claim 16, comprising the steps of:
   a) providing the composition in a solid form
   b) softening the composition by raising the temperature;
   c) shaping the softened composition
   d) cooling down the shape.

19. The process of claim 18, wherein said shaping is performed by compression molding, injection molding, hot pressing or extrusion.

20. The process of claim 18, wherein said shaping is performed by injection molding.

* * * * *